United States Patent
Davis

(10) Patent No.: US 6,282,650 B1
(45) Date of Patent: Aug. 28, 2001

(54) SECURE PUBLIC DIGITAL WATERMARK

(75) Inventor: Derek L. Davis, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/237,323

(22) Filed: Jan. 25, 1999

(51) Int. Cl.[7] ............... H04L 9/32; H04L 1/44; G06F 12/14
(52) U.S. Cl. .......... 713/176; 713/193; 380/246; 380/282
(58) Field of Search .................. 713/172, 176, 713/193, 194; 380/46, 51, 54, 55, 243, 246, 282, 285

(56) References Cited

U.S. PATENT DOCUMENTS

| | | | |
|---|---|---|---|
| 4,138,196 | 2/1979 | Redman | 356/350 |
| 4,296,326 | 10/1981 | Haslop et al. | 250/372 |
| 4,754,327 | 6/1988 | Lippert | 358/88 |
| 5,118,526 | 6/1992 | Allen et al. | 427/161 |
| 5,267,042 | 11/1993 | Tsuchiya et al. | 358/209 |
| 5,568,552 | 10/1996 | Davis | 380/4 |
| 5,604,529 | 2/1997 | Kuga et al. | 348/46 |
| 5,636,362 | 6/1997 | Stone et al. | 395/456 |
| 5,659,195 | 8/1997 | Kaiser et al. | 257/415 |
| 5,664,018 | 9/1997 | Leighton | 380/54 |
| 5,675,654 | * 10/1997 | Ryan | 380/48 |
| 5,687,236 | 11/1997 | Moskowitz et al. | 380/28 |
| 5,822,432 | 10/1998 | Moskowitz et al. | 380/28 |
| 5,825,892 | 10/1998 | Braudaway et al. | 380/51 |
| 5,848,155 | 12/1998 | Cox | 380/4 |
| 5,875,249 | 2/1999 | Mintzer et al. | 380/54 |
| 6,131,162 | * 10/2000 | Yoshiura et al. | 713/176 |

FOREIGN PATENT DOCUMENTS 0 555 715 A1   8/1993   (EP) .............. G06F/12/14

OTHER PUBLICATIONS

Schneier, B., "Applied Cryptography: Protocols, Algorithms, and Source Code in C," Second Edition, Oct. 18, 1995, pp. 31–34.*

* cited by examiner

Primary Examiner—Tod Swann
Assistant Examiner—Justin T. Darrow
(74) Attorney, Agent, or Firm—Blakely, Sokoloff, Taylor & Zafman LLP

(57) ABSTRACT

A cryptographic device and corresponding method for producing a cloaked watermark which is a private watermark having the functionality of a public watermark. In one embodiment, the cryptographic device comprises an internal memory and a processor contained in a package. The internal memory provides a region for storage of key information used at least to produce the cloaked watermark. The processor is coupled to the internal memory and is responsible for producing a cloaked watermark based on the key and for inserting the cloaked watermark into an outgoing data set.

20 Claims, 5 Drawing Sheets

SECURE PUBLIC DIGITAL WATERMARK

BACKGROUND

1. Field

The present invention relates to the field of data security, and in particular, this invention relates to digital watermarking.

2. General Background

Each day, consumers receive information from content providers in a variety of forms such as movies, television programming and the like. When transmitted in a standard analog format, the information is somewhat protected due to the inherent nature of analog signaling. For example, a recorded movie has poorer image quality than the original analog version.

Over the last few years, there has been a growing demand for digital content. In general, "digital content" involves the transmission of one or more digitized data sets. Each "data set" includes data with perceivable content (e.g., a still image, a frame of video, alphanumeric character representations, audio, Internet Protocol "IP" commands, a program, etc.). Unlike analog, digital content can be easily manipulated without affecting the quality of the original data set. This "quality" may be measured through visual clarity of an image, audible clarity during audio playback, accuracy of characters in text or code as well as other factors. Since digital content can be easily manipulated, content providers have been hesitant in supporting digital content distribution, in part, due to the absence of a mechanism to protect against unauthorized copying and/or illegal distribution of their digital content.

Recently, digital watermarking has emerged as a technique to protect against unauthorized copying and distribution of digital content. In general, "digital watermarking" comprises an act of embedding information (referred to as a "watermark") into the data set in an unobtrusive way so that the quality of the data set is not reduced, but the watermark can be extracted as the data set is being used. This is accomplished by placing the watermark into a noise band of the data set. The "noise band" may include, for example, a few least significant bits associated with the color of each pixel of an image.

In addition, a watermark may be embedded to be resilient to various manipulations of the data set such as, for example, photocopying, scanning, resizing, cropping and color manipulation. Of course, the selected degree of resiliency is determined by the amount of information that can be embedded in a data set. As an illustrative example, if resiliency to cropping is desired, a watermark is placed in a redundant fashion in different portions of the data set. If such cropping resiliency is not desired, bandwidth consumed by such redundancy may be allocated to improve quality of the data set.

Currently, there are two types of watermarks: (i) public watermarks and (ii) private watermarks. These watermarks serve different functions. For example, a "public watermark" is readable by widely-available software and is generally used to enable a consumer of the data set to identify its source. As a result, public watermarks are used to embed copyright notices, licensing contacts or other information. This information can be obtained by consumers through use of the widely-available software. However, public watermarks are relatively simple to remove or to forge.

A "private watermark" is a digital watermark embedded using a technique similar to symmetric key cryptography, but the key is held in secrecy, known only to the person or entity applying the private watermark who is normally the original owner of the content. For reading purposes, locating the private watermark in the data set requires knowledge of the secret key, and thus, the private watermark is not easy to remove. This allows an original owner to identify copyright violations and prove ownership of the data set. However, since the secret key needs to remain confidential, reader software having access to the secret key cannot be available to the public at large. Thus, use of a private watermark, by itself, would prevent legitimate consumers from checking whether digital content is covered by foreign or domestic copyright laws, ascertaining the name of the licensing contacts, if any, who have the authority to license use of the digital content or from retrieving other information placed in the private watermark.

As a result, under the current scheme, unless both public and private watermarks are used, unauthorized copying and/or distribution of digital content will continue. Unfortunately, when applying both types of watermarks, an unacceptable amount of bandwidth is used, which affects the quality of the data set. Therefore, it would be beneficial to create a new watermarking technique which utilizes the advantages of both public watermarks and private watermarks.

SUMMARY OF THE INVENTION

Briefly stated, the present invention relates to a cryptographic device comprising an internal memory and a processor contained in a package. The internal memory includes a predetermined region dedicated for receipt of a key for producing a cloaked watermark. The contents of the predetermined region are inaccessible outside the package. The processor produces the cloaked watermark from the key and inserts the cloaked watermark into an outgoing data set.

BRIEF DESCRIPTION OF THE DRAWINGS

The features and advantages of the present invention will become apparent from the following detailed description of the present invention in which.

DETAILED DESCRIPTION OF AN EMBODIMENT

Herein, embodiments of the present invention relate to a system and method for embedding and analyzing a digital watermark without exposure of the specifics of the watermark to a user. In the following description, certain examples of hardware and methods of operation should be broadly construed in an illustrative sense, not a restrictive sense.

To clarify various qualities of the present invention, certain terminology set forth below is used to describe hardware or cryptographic functions. In particular, an "electronic system" comprises any hardware with processing and internal data storage capability. Examples of electronic systems include open, re-programmable digital platforms (e.g., mobile computers, desktop computers, servers, network computers, set-top boxes, hand-helds such as personal digital assistants or digital books, etc.), imaging equipment (e.g., printers, facsimile machines, scanners, etc.), automated teller machines and the like. "Digital information" generally comprises one or more bits of data, address, control signals or any combination thereof.

With respect to cryptography related terminology, a "key" comprises an encoding and/or decoding parameter. This parameter may be a sequence of binary data such as, for example, (i) public or private keys used by an asymmetric cryptographic function (e.g., Rivest, Shamir and Adleman "RSA" based functions, Elliptic Curve, etc.) or (ii) a secret key shared in confidence between the two electronic systems executing a symmetric cryptographic function (e.g., Data Encryption Standard "DES"). A "digital signature" is digital information encrypted with a private key of its signatory to ensure that the information has not been illicitly modified after being digitally signed. In other words, the digital signature authenticates the integrity of the digital information which is provided in its entirety or as a digest produced by a one-way hash function. A "one-way hash function" includes a function, mathematical or otherwise, that takes information of a variable-length and converts it into a fixed-length referred to as a "digest". The term "one-way" indicates that there does not readily exist an inverse function to recover any discernible portion of the original information from the fixed-length digest. A "digital certificate" is defined herein as digital information used to authenticate a sender of information. For example, a digital certificate may include a public key, associated with an electronic system or entity (person, company, etc.) being certified, which is encrypted with the private key of a certification authority. Examples of a "certification authority" includes a manufacturer, a trade association, a governmental entity, a bank or any other entity held in trust by the consumer.

Figure 1:
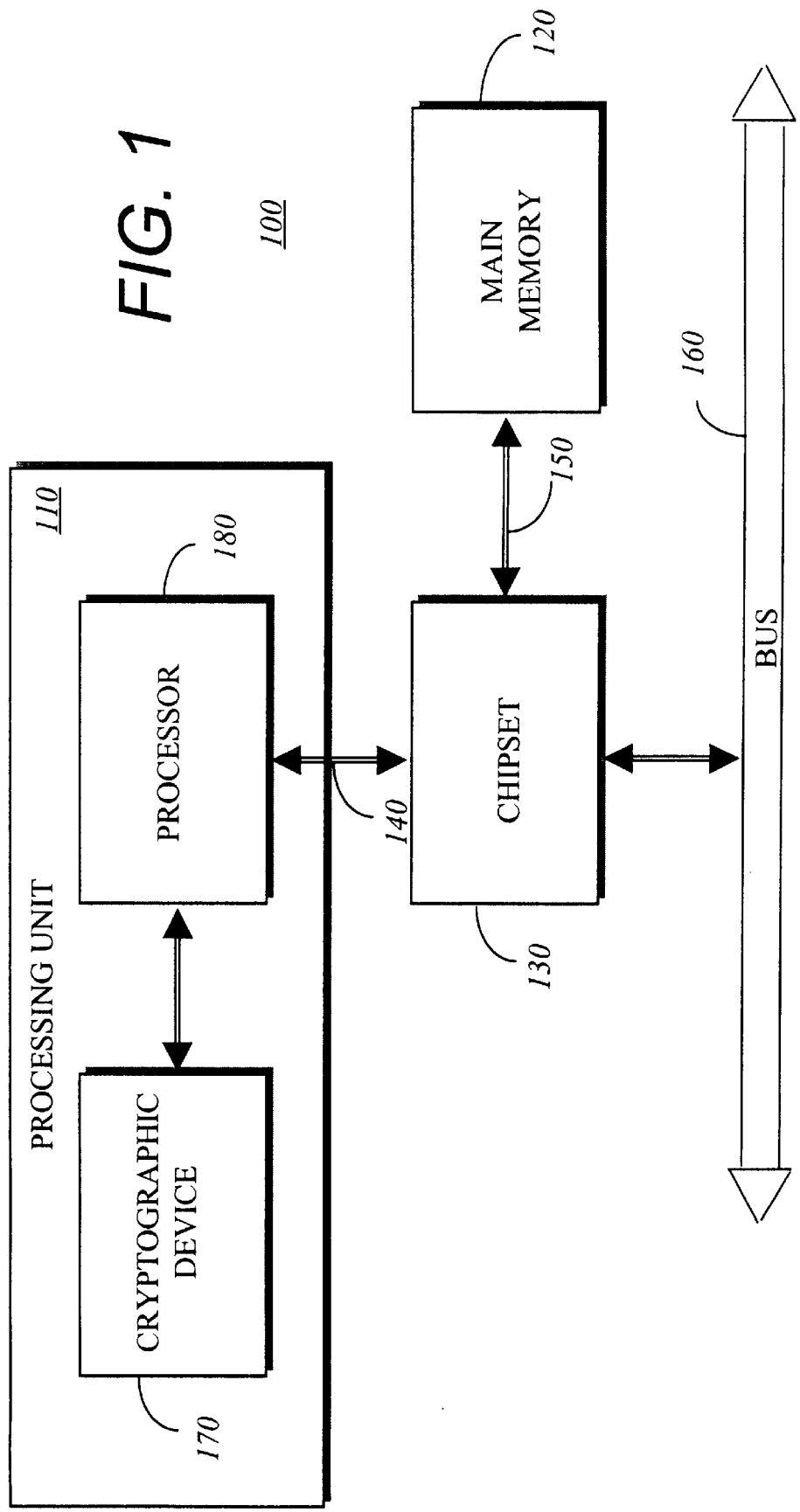
FIG. 1 is a diagram of an illustrative embodiment of a digital platform providing digital watermarking through a cryptographic device.

Referring to FIG. 1, a diagram of an illustrative embodiment of an electronic system 100 employing the present invention is shown. Electronic system 100 comprises a processing unit 110 and a main memory 120 coupled together by a chipset 130. The processing unit 110 includes a processor 180 such as, for example, a general purpose microprocessor, a digital signal processor, a microcontroller, an application specific integrated circuit (ASIC) with information processing functionality, a combinatorial logic and the like. The chipset 130 routes the flow of information through a plurality of buses, namely a host bus 140, a memory bus 150 and a bus 160. Embodiments of bus 160 may include a multiplexed bus (e.g., a Peripheral Component Interconnect "PCI" bus), an Industry Standard Architecture (ISA) bus or any other type of bus architecture. It is contemplated that bus 160 is shown as a single bus, but it may be implemented as multiple buses coupled together through bridge circuitry. In that instance, when a device is coupled to bus 160, it is considered to be coupled to at least one of the multiple buses associated with bus 160.

As shown, digital watermarking functionality may be supported either by a separate cryptographic device 170 in communication with processor 180 as shown, or by any number of embodiments such as, for example, logic implemented in chipset 130 or as a peripheral device coupled to bus 160. Of course, there exists many other embodiments which, although slightly different in design, do not deviate from the spirit and scope of the invention such as the integration of this digital watermarking functionality into processor 180 of processing unit 110 to avoid the need for a cryptographic device 170.

Figure 2:
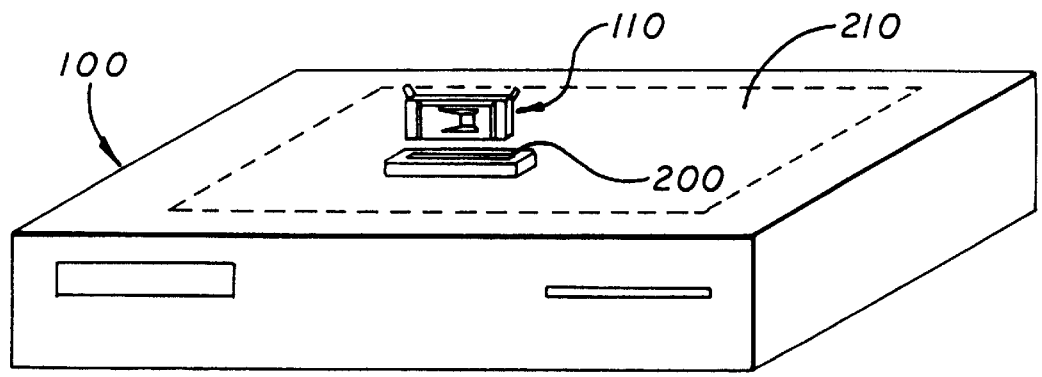
FIG. 2 is a diagram of an illustrative embodiment of a processing unit including a cryptographic device featuring digital watermarking functionality.

Referring now to FIG. 2, a diagram of an illustrative embodiment of processing unit 110 placed with electronic system 100 is shown. Controlling the digital watermarking functionality of electronic system 100, processing unit 110 is connected to a connector 200 which is mounted on a system substrate 210. Typically, "system substrate" 210 includes a circuit board (e.g., motherboard, daughter card, smart card, etc.) formed with any type of material or any combination of materials upon which integrated circuit (IC) devices can be attached. In this embodiment, connector 200 enables communications between logic placed on system substrate 210 and processing unit 110. Any style for connector 200 may be used, including a standard female edge connector as shown, a pin field connector, a socket attached to system substrate 210 and the like.

Figure 3:
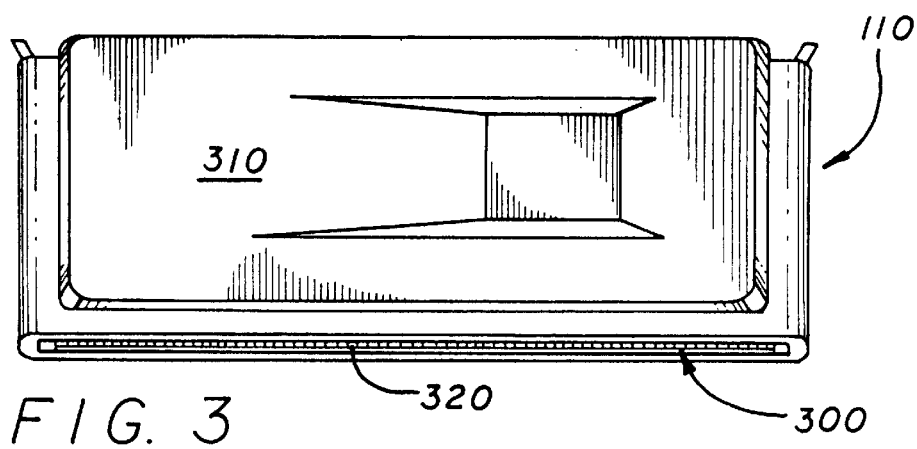
FIG. 3 is a diagram of an illustrative embodiment featuring a more detailed representation of the processing unit of FIG. 2.

Referring to FIG. 3, a diagram of one embodiment of processing unit 110 is shown. Processing unit 10 features a processor substrate 300, which is formed from any type of material to which circuitry can be attached through well-known techniques (e.g., solder connections). Herein, processor substrate 300, substantially covered by a package 310 in order to protect its circuitry from damage or harmful contaminants, includes a connector 320. Connector 320 may be adapted to establish a mechanical and an electrical connection with connector 200 of FIG. 2. In this embodiment, connector 320 includes a standard male edge connector.

Figure 4:
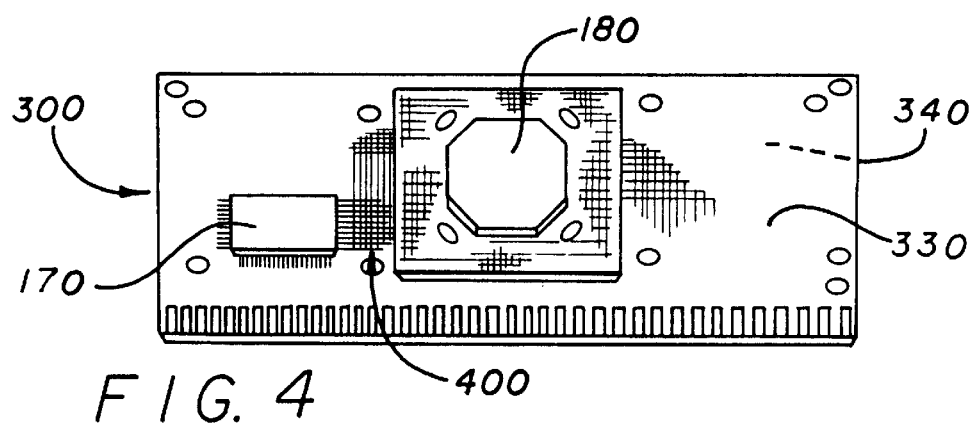
FIG. 4 is a diagram of an illustrative embodiment of a substrate of the processing unit of FIGS. 2 and 3.

Referring to FIG. 4, a diagram of an illustrative embodiment of processor substrate 300 are shown. The circuitry of processor substrate 300 includes, but is not limited or restricted to processor 180 mounted on a top side surface 330 of processor substrate 300 and cryptographic device 170 mounted on a back side surface 340. To enable communications with processor 180, in this embodiment, cryptographic device 170 may be connected to processor 400 through a back-side bus (not shown). Alternatively, cryptographic device 170 may be connected to dedicated processor bus 400 as shown or a front-end bus.

Figure 5:
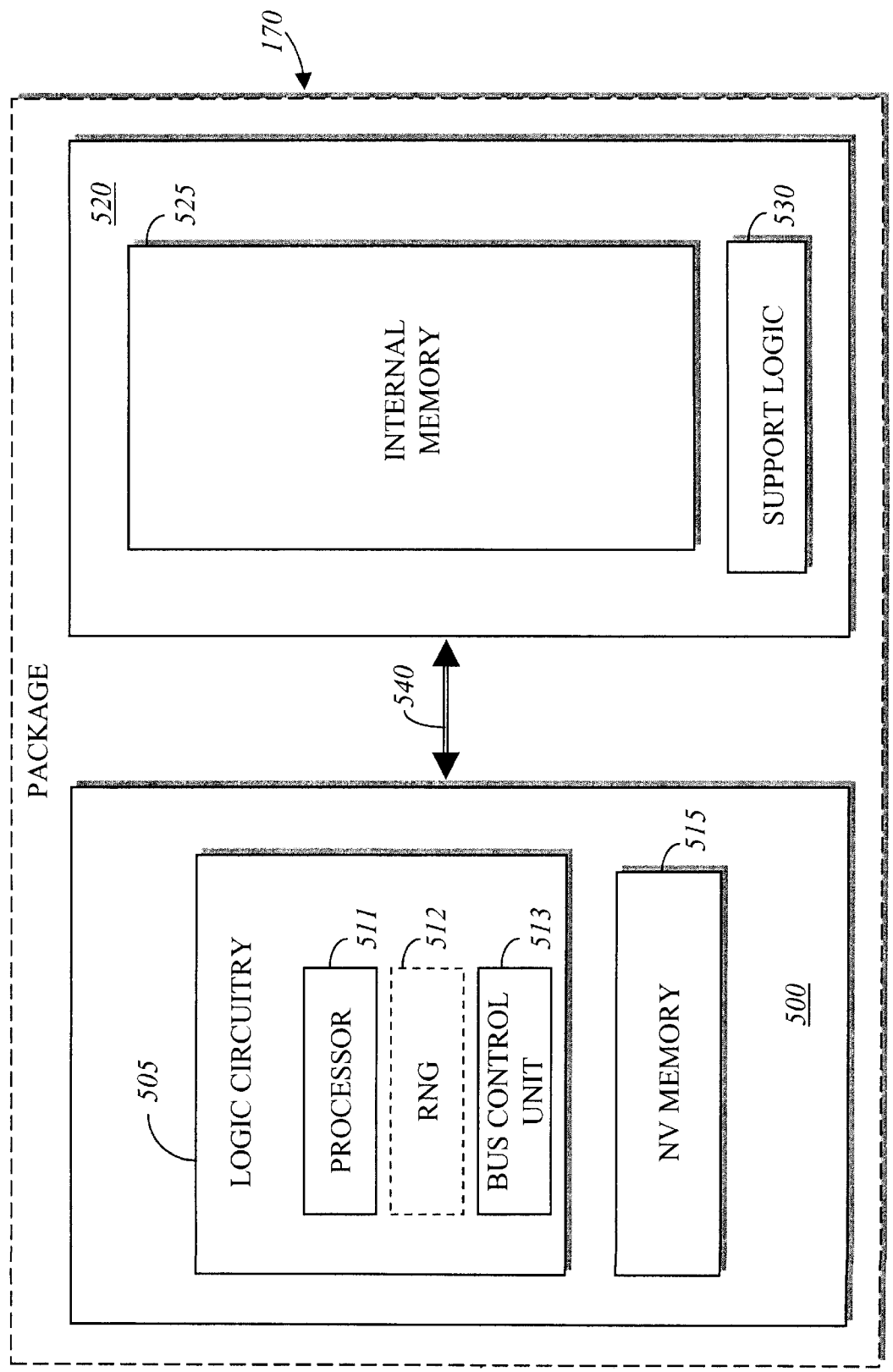
FIG. 5 is a diagram of an illustrative embodiment of the cryptographic device of FIG. 4.

Referring now to FIG. 5, one embodiment of cryptographic device 170 generally includes firmware which controls digital watermarking operations and provides a secure environment because this firmware is inaccessible by the user of the electronic system. Such inaccessibility may be accomplished through a number of techniques such as restricting user access to a particular region of internal memory assigned for storage of the firmware (described below), preventing content from being removed from cryptographic device 170 in a plain text format and the like. In this embodiment, the firmware of cryptographic device 170 produces or recovers a "cloaked watermark", namely, a private watermark having the attributes of a public watermark. For example, a secret key used to produce a private digital watermark is loaded into the firmware, while still maintaining its confidentiality. The loading of the secret key may be accomplished, for example, by encrypting the secret key with a public key of cryptographic device 170.

As shown in FIG. 5, one embodiment of cryptographic device 170 includes a multi-chip implementation comprising a first integrated circuit (IC) device 500 and a second IC device 520, both coupled to an internal bus 540. In one embodiment, to prevent signal analysis over internal bus 540, both of IC devices 500 and 520 are contained within a multi-chip package. Of course, as an option, IC devices 500 and 520 may be placed in separate IC packages before being packaged if multi-package protection is desired. Alternatively, if lesser security is tolerated, IC devices 500 and 520 may be placed in separate packages without a common package.

As shown, second IC device 520 includes internal memory 525 and a small amount of support logic 530. Support logic 530 includes interface circuitry to handle information received from and routed to first IC device 500. As an option, support logic 530 includes one or more cryptographic engines to perform various cryptographic operations in communication with first IC device 500. These cryptographic engine(s) operate as a symmetric (e.g., DES-based) encryption/decryption unit or an asymmetric (e.g., RSA-based) encryption/decryption unit.

As further shown, in this embodiment, internal memory 525 comprises non-volatile memory such as, for example, read only memory (ROM), erasable programmable read-only memory (EPROM), electrically erasable programmable read-only memory (EEPROM) or flash memory. Internal memory 525 is loaded with a software code, which when executed, causes a cloaked watermark to be embedded into a data set. A portion of internal memory 525, inaccessible to the user, includes a key used by the software code to produce the cloaked watermark internally within cryptographic device 410 (hereafter referred to as a "watermark key").

Referring still to FIG. 5, first IC device 500 is logic circuitry 505 including a small amount of non-volatile memory 510. Logic circuitry 505 includes a processor 511, an optional random number generator (RNG) 512 (as denoted by dashed lines) and a bus control unit 513. RNG 512 generates values used to produce key(s) internally within cryptographic device 170. The bus control unit 513 provides an interface to control the transfer of information between cryptographic device 170 and host processor 180 of FIG. 4 through the dedicated processor bus 400 as well as to communicate with second IC device 520. Although not shown, as an option, logic circuitry 505 includes one or more cryptographic engines to support cryptographic communications with second IC device 520.

It is contemplated, however, that the watermark key may be stored outside the package if there exists a protection mechanism to prevent access to the watermark key in its plain text. For example, a crypto-paging technique described in U.S. Pat. No. 5,757,919 entitled "Cryptographically Protected Paging Subsystem" incorporated herein by reference, may be used. This would involve the assignment of an integrity check valve (ICV) being a one-way hash value of the watermark key. The ICV is stored in a secure environment (e.g., within the cryptographic device) before initially outputting the watermark key. Upon returning the watermark key to the cryptographic device, it undergoes a hash operation and the hash result is compared to the one-way hash value. If a match is detected, the watermark key may be used by the cryptographic device. Otherwise, it is discarded. Other protection mechanisms may be used in the alternative, such as storing the watermark key in an encrypted format.

Figure 6:
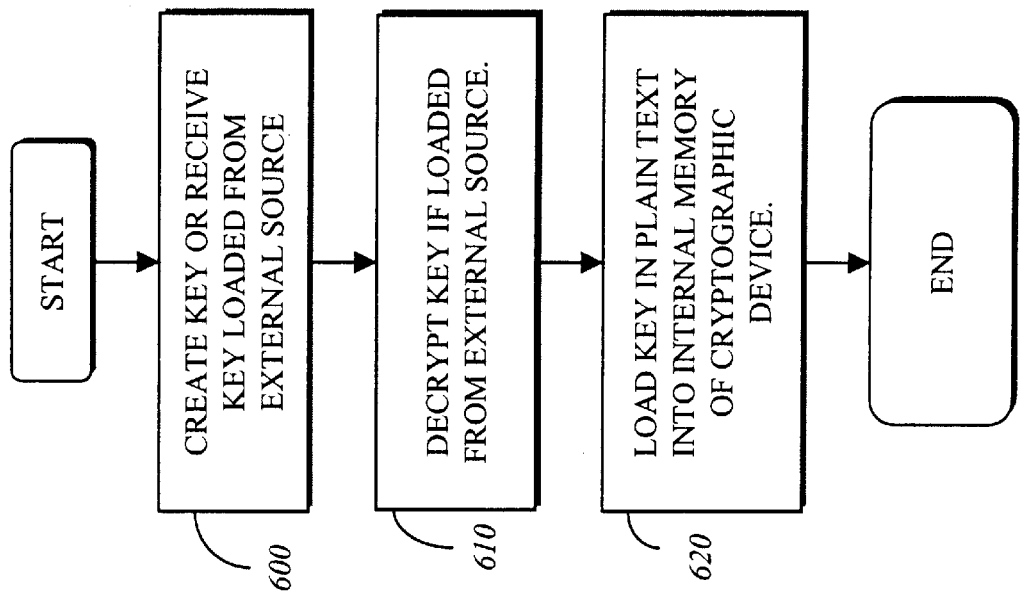
FIG. 6 is a flowchart illustrating the receipt or generation of a key for a cloaked watermark.

Referring now to FIG. 6, a flowchart illustrating an embodiment of the operations of an electronic system to receive a key necessary to recover and produce a cloaked watermark is shown. First, in block 600, a watermark key used to produce the cloaked watermark is either (i) created from a seed number generated by RNG 512 of FIG. 5, or (ii) loaded into the cryptographic device from an external source. The watermark key is known exclusively by the entity for whom the cloaked watermark protects against content misappropriation. In the latter event, in one embodiment, loading of the watermark key is accomplished by encrypting the watermark key with a public key assigned to the cryptographic device and transferring the encrypted watermark key to the cryptographic device. Thus, only the cryptographic device is able to recover the watermark key through decryption (block 610). Now, in its plain text format, the watermark key is stored within internal memory of the cryptographic device (block 620) and will not be provided in its plain text format outside the cryptographic device.

Figure 7:
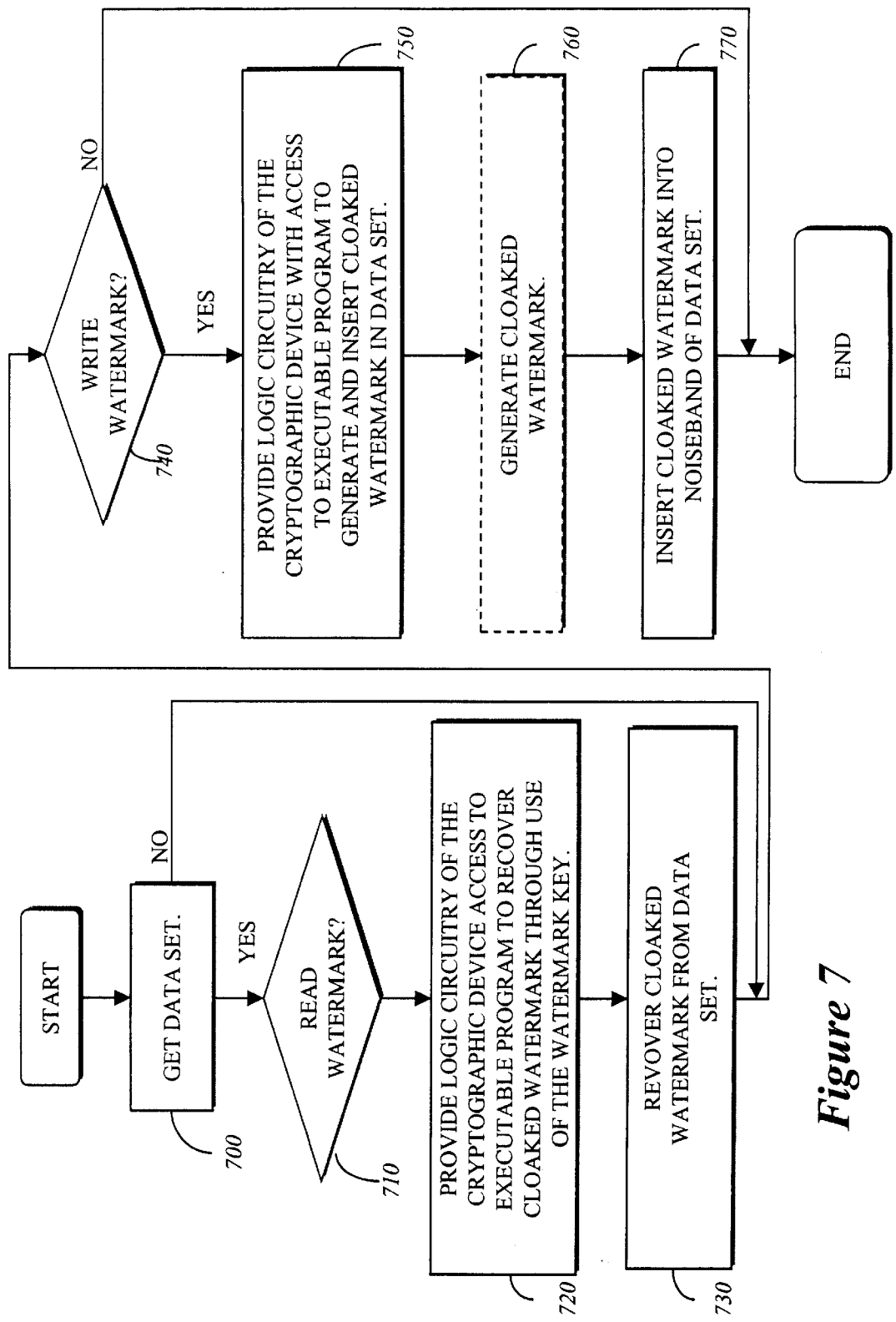
FIG. 7 is an illustrative flowchart of the watermarking process associated with an embodiment of the present invention.

Referring to FIG. 7, an illustrative flowchart of the operations for recovering a cloaked watermark from or applying a cloaked watermark to a data set is shown. For a data set contained in the electronic system (block 700), a determination is made whether to read a watermark from the data set or to write a cloaked watermark to the data set. If the watermark is to be read (block 710), cryptographic device loads a first executable program into internal memory and that executable program is run to recover the cloaked watermark (blocks 720 and 730) by using the stored watermark key. One recovery technique is to assimilate watermark information from a predetermined noise band of the data set.

Alternatively, upon determining that a cloaked watermark is to be written into the data set (block 740), cryptographic device loads a second executable program into internal memory and this executable program is run to encrypt information which is embedded as the cloaked watermark into the noise band of the data set (blocks 750 and 770) by using the stored watermark key. It is contemplated that, as an option, the cloaked watermark may have to be generated before insertion into the noise band (block 760).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A cryptographic device comprising:
   a package;
   an internal memory contained within the package, the internal memory including a predetermined region dedicated for receipt of a key for producing a cloaked watermark, the contents of the predetermined region being inaccessible outside the package; and
   a processor contained within the package and coupled to the internal memory, the processor to produce the cloaked watermark from the key and to insert the cloaked watermark into an outgoing data set.

2. The cryptographic device of claim 1 further comprising a random number generator contained in the package, the random number generator to generate a value used to produce the key.

3. The cryptographic device of claim 1, wherein the internal memory further contains software to produce the cloaked watermark based on the key as input.

4. The cryptographic device of claim 1, wherein the internal memory further contains a first executable program which, when executed by the processor, inserts the cloaked watermark into the outgoing data set.

5. The cryptographic device of claim 4, wherein the internal memory further contains a second executable program which, when executed by the processor, extracts the cloaked watermark from an incoming data set.

6. The cryptographic device of claim 1, wherein the internal memory further contains a private key to decrypt the key placed in an encrypted format before storage of the key into the predetermined region of the internal memory.

7. A system comprising:

a system substrate; and a processor substrate coupled to the system substrate, the processor substrate including a cryptographic device including (i) an internal memory including a predetermined region dedicated for receipt of a key reserved for producing a cloaked watermark being a publicly accessible private watermark, and (ii) a processor coupled to the internal memory, the processor to produce the cloaked watermark from the key and to either embed the cloaked watermark into or recover the cloaked watermark from a data set.

8. The system of claim 7, wherein the cryptographic device further includes a package containing both the internal memory and the processor.

9. The system of claim 8, wherein the key is stored in a predetermined region of the internal memory inaccessible outside the package.

10. The system of claim 8, wherein the cryptographic device further comprises a random number generator to generate a value used to produce the key entirety within the package.

11. The system of claim 9, wherein the internal memory of the cryptographic device further contains software to produce the cloaked watermark based on the key as input.

12. The system of claim 11, wherein the software is stored in the predetermined region of the internal memory.

13. The system of claim 9, wherein the internal memory of the cryptographic device further contains an executable program to extract the cloaked watermark from the data set.

14. The system of claim 13, wherein the executable program is stored in the predetermined region of the internal memory.

15. The system of claim 9, wherein the internal memory of the cryptographic device further contains a private key corresponding to the key initially in an encrypted format when loaded into the cryptographic device before storage of the key in a decrypted format into the predetermined region of the internal memory.

16. The system of claim 7, wherein the system substrate includes a motherboard.

17. The system of claim 7, wherein the system substrate includes a removable daughter card.

18. The system of claim 7, wherein the system substrate includes a smart card.

19. A method comprising:

loading a key within a reserved portion of internal memory of a cryptographic device, the reserved portion accessible only by logic within the cryptographic device;

producing a cloaked watermark from the key within the cryptographic device, the cloaked watermark being a private watermark having functionality of a public watermark; and embedding the cloaked watermark into a noise band of an outgoing data set.

20. A method comprising:

loading an encrypted key within a reserved portion of internal memory of a cryptographic device, the reserved portion solely accessible by logic within the cryptographic device;

receiving a data set by the cryptographic device;

decrypting the encrypted key within the cryptographic device to recover a key;

extracting a cloaked watermark from a noise band of the data set within the cryptographic device using the key, the cloaked watermark being a private watermark having functionality of a public watermark;

recovering a master copy of the clocked watermark stored within the cryptographic device; and determining whether the extracted cloaked watermark matches a master copy of the cloaked watermark.

* * * * *

UNITED STATES PATENT AND TRADEMARK OFFICE
CERTIFICATE OF CORRECTION

PATENT NO.    : 6,282,650 B1                                        Page 1 of 1
DATED         : August 28, 2001
INVENTOR(S)   : Davis It is certified that error appears in the above-identified patent and that said Letters Patent is hereby corrected as shown below:

<u>Column 4,</u>
Line 26, delete "10" before "features", insert -- 110 --.

Signed and Sealed this

Seventh Day of May, 2002

Attest:

Attesting Officer

JAMES E. ROGAN
Director of the United States Patent and Trademark Office